US011029168B2

(12) United States Patent
Stroman et al.

(10) Patent No.: US 11,029,168 B2
(45) Date of Patent: Jun. 8, 2021

(54) METHOD FOR IDENTIFYING OPTIMAL VEHICLE PATHS WHEN ENERGY IS A KEY METRIC OR CONSTRAINT

(71) Applicant: The Government of the United States of America, as represented by the Secretary of the Navy, Arlington, VA (US)

(72) Inventors: Richard Stroman, Washington, DC (US); Daniel J. Edwards, Alexandria, VA (US); Daniel S. Newton, Springfield, VA (US); John J. Bird, State College, PA (US); Jacob W. Langelaan, State College, PA (US); Vladimir Dobrokhodov, Seaside, CA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 366 days.

(21) Appl. No.: 16/155,968

(22) Filed: Oct. 10, 2018

(65) Prior Publication Data

US 2019/0107408 A1    Apr. 11, 2019

Related U.S. Application Data

(60) Provisional application No. 62/570,349, filed on Oct. 10, 2017.

(51) Int. Cl.
*G01C 21/34* (2006.01)
*G01C 21/36* (2006.01)

(52) U.S. Cl.
CPC ....... *G01C 21/3469* (2013.01); *G01C 21/343* (2013.01); *G01C 21/3691* (2013.01)

(58) Field of Classification Search
CPC .............. G01C 21/3469; G01C 21/343; G01C 21/3691; G05D 1/0607; G05D 1/0005
See application file for complete search history.

(56) References Cited

U.S. PATENT DOCUMENTS

| 2005/0216182 A1* | 9/2005 | Hussain | .................. G01C 21/20 |
| | | | 701/532 |
| 2011/0125344 A1* | 5/2011 | An | .................... G08G 1/096725 |
| | | | 701/2 |

(Continued)

OTHER PUBLICATIONS

Langelaan, et al., Green Flight Challenge: Aircraft Design and Flight Planning for Extreme Fuel Efficiency, Journal of Aircraft, Mar. 12, 2013, pp. 832-846, vol. 50, No. 3, American Institute of Aeronautics and Astronautics, Inc. Reston, VA, USA.

(Continued)

*Primary Examiner* — Thomas Ingram
(74) *Attorney, Agent, or Firm* — US Naval Research Laboratory; Suresh Koshy

(57) ABSTRACT

A computer-readable medium storing instructions that, when executed by a computer in a vehicle, cause the computer to carry out a method for determining an energy-optimal path for the vehicle from an initial location to a final location, the vehicle corresponding to a vehicle energy model. Based at least on the initial location, an initial time, the final location, the vehicle energy model, and an environmental forecast a global path is generated. The global path includes a final maximum net energy path and a plurality of waypoints. Based on the global path a local path from the present location to a next waypoint of the plurality of waypoints is generated. Whether a net energy gain is generated by a deviation from the global path to the next waypoint of the plurality of waypoints is determined. Generating a local path is repeated until the vehicle reaches the final location.

16 Claims, 6 Drawing Sheets

(56) References Cited

U.S. PATENT DOCUMENTS

| | | | |
|---|---|---|---|
| 2013/0211656 A1* | 8/2013 | An | G05D 1/0285 |
| | | | 701/25 |
| 2015/0142308 A1* | 5/2015 | Schmidt | B60K 35/00 |
| | | | 701/467 |
| 2016/0129907 A1* | 5/2016 | Kim | B60W 30/09 |
| | | | 701/26 |

OTHER PUBLICATIONS

Chakrabarty, et al., Energy-Based Long-Range Path Planning for Soaring-Capable Unmanned Aerial Vehicles, Journal of Guidance, Control, and Dynamics, Aug. 2-5, 2010, pp. 1002-1015, vol. 34, No. 4, American Institute of Aeronautics and Astronautics, Inc., Reston, VA, USA.

Chakrabarty, et al., UAV Flight Path Planning in Time Varying Complex Wind-fields, In Proceedings of the 2013 American Control Conference, Jun. 17-19, 2013, pp. 2574-2580, IEEE Control Systems Society, Washington, DC, USA.

Lee, et al., Active Power Management System for an Unmanned Aerial Vehicle Powered by Solar Cells, a Fuel Cell, and Batteries, IEEE Transactions on Aerospace and Electronic Systems, Mar. 2, 2014, pp. 3167-3177, vol. 50, No. 4, IEEE Aerospace and Electronic Systems Society, Piscataway, NJ, USA.

Kierzenka, et al., A BVP Solver that Controls Residual and Error, Journal of Numerical Analysis, Industrial and Applied Mathematics, Jun. 25, 2017, pp. 27-41, vol. 3, No. 1-2, European Society of Computational Methods in Sciences and Engineering, Greece.

Eichborn, Optimal Routing Strategies for Autonomous Underwater Vehicles in Time-Varying Environment, Robotics and Autonomous Systems, Aug. 29, 2013, pp. 33-43, vol. 67, Elsevier, Amsterdam, Netherlands.

Krantz, et al., Scaling Initial and Boundary Value Problems: A Tool in Engineering Teaching and Practice, Chemical Engineering Education, 1994, pp. 236-253, vol. 28, No. 4, Chemical Engineering Division of American Society for Engineering Education, Washington, DC.

Guerrero, et al., UAV Path Planning for Structure Inspection in Windy Environments, Journal of Intelligent Robotic Systems, Sep. 8, 2012, pp. 297-311, vol. 69, Springer Publishing, New York City, USA.

Klesh, et al., Solar-Powered Aircraft: Energy-Optimal Path Planning and Perpetual Edurance, Journal of Guidance, Control, and Dynamics, Jul.-Aug. 2009, pp. 1320-1329, vol. 32, No. 4, American Institute of Aeronautics and Astronautics, Inc., Reston, VA, USA.

Hagelauer, et al., A Soft Dynamic Programming Approach for On-line Aircraft 4D-Trajectory Optimization, European Journal of Operational Research, 1998, pp. 87-95, vol. 107, Elsevier, Amsterdam, Netherlands.

Garcia-Heras, et al., A Comparison of Optimal Control Methods for Minimum Fuel Cruise at Constant Altitude and Course with Fixed Arrival Time, $3^{rd}$ International Symposium on Aircraft Airworthiness, ISAA 2013, Procedia Engineering, 2014, pp. 231-244, vol. 80, Elsevier, Amsterdam, Netherlands.

Wirth, et al., Meteorological Path Planning Using Dynamic Programming for a Solar-powered UAV, 2015 IEEE Aerospace Conference, Mar. 7-14, 2015, pp. 1-11, IEEE, Big Sky, MT, USA.

\* cited by examiner

METHOD FOR IDENTIFYING OPTIMAL VEHICLE PATHS WHEN ENERGY IS A KEY METRIC OR CONSTRAINT

CROSS-REFERENCE TO RELATED APPLICATIONS

The present application claims priority to U.S. Provisional Patent Application Ser. No. 62/570,349, which was filed on 10 Oct. 2017 and is incorporated herein by reference.

BACKGROUND OF THE INVENTION

Field of the Invention

This invention relates in general to a method for generating an optimal vehicle path for directing an autonomous vehicle or for augmenting a human operator of a vehicle, and in particular to a method for generating an maximum net energy path for directing the autonomous vehicle or for augmenting a human operator of the vehicle.

Description of the Related Art

Energy is a key constraint on the performance of unmanned air, ground, and underwater vehicles because it dictates their range, endurance, and payload capacity. There are two energy-related ways to improve the performance of unmanned system: store more energy or manage the available energy more intelligently. Energy may be available from on-board storage and/or from the environment.

A good example of a vehicle extracting energy from the environment is a solar energy harvesting air vehicle in a heterogeneous environment where wind and solar irradiance vary in time and space. In such an environment, a path which minimizes headwinds and/or maximizes tailwinds yields a minimum energy consumption trajectory. There is also a trajectory which maximizes the solar energy harvested by balancing the additional energy cost of flying to sunnier regions with the additional energy gained.

Path optimization with respect to winds (or ocean currents) has been known for many years and is practiced commercially for the routing of airliners and ocean-going ships to reduce fuel consumption and/or minimize trip duration. Seeking or lingering in high solar irradiance regions is also not a novel idea by itself.

In the field of ground robotics, a planning process for determining a shortest path for ground robots without crashing into objects is often broken into a global path planning problem and a local path planning problem. In a typical implementation, a global path planner takes a present location of a vehicle and a desired future location, and then generates a series of waypoints that the vehicle will follow to travel from the present location to the desired final location. The locations of these waypoints are based on some knowledge of the environment (such as elevation) and the waypoints are selected to respect constraints (such as maximum slope). As the vehicle transits the path, it measures features of the environment and those measurements are used by a local path planner to direct the vehicle between global waypoints. Goals of the local path planner often include obstacle avoidance. For example, when a person walks between the vehicle and the next global waypoint, conventional local path planning permits the vehicle to avoid a collision with the person.

BRIEF SUMMARY OF THE INVENTION

An embodiment of the invention includes a computer-readable medium storing instructions that, when executed by a computer in a vehicle, cause the computer to carry out a method for determining an energy-optimal path for the vehicle from an initial location to a final location, the vehicle corresponding to a vehicle energy model. Based at least on the initial location, an initial time, the final location, the vehicle energy model, and an environmental forecast a global path is generated. The global path can be thought of as an aspect of a trajectory between the initial location and the final location. For example, this trajectory includes two control laws for the directional and translational controls. The first control law defines the optimal direction to follow, the optimal direction being the direction that effectively maximizes the tailwind utilization and sails through the headwind. The second one control law defines the vehicle controls to follow the global path, including but not limited to optimally utilizing the available energy (e.g., of the sun) and minimizing fuel burn. The global path includes a final maximum net energy path and a plurality of waypoints that conveniently discretize the trajectory. Based on the global path a local path from the present location to a next waypoint of the plurality of waypoints is generated. Whether a net energy gain is generated by a deviation from the global path to the next waypoint of the plurality of waypoints is determined. Generating a local path is repeated until the vehicle reaches the final location.

An embodiment of the invention identifies (i.e., plans) an energy-optimal path (i.e., trajectory) for a vehicle. For example, such an energy-optimal path minimizes fuel consumed to reach a destination (with optional maximum time constraint); minimizes time to reach a destination (for example, subject to a minimum energy-remaining constraint); achieves the greatest range; and/or achieves the greatest endurance.

An embodiment of the invention includes one or more of the following benefits:
1. greater vehicle range and endurance;
2. reduced fuel consumption through reduced energy consumption and/or greater capture of energy from the environment, which in turn fosters a reduced logistics burden;
3. more fuel (e.g., energy) available upon arrival to carry out another mission; and/or
4. reduced transit time from starting location to destination.

DETAILED DESCRIPTION OF THE INVENTION

Figure 1:
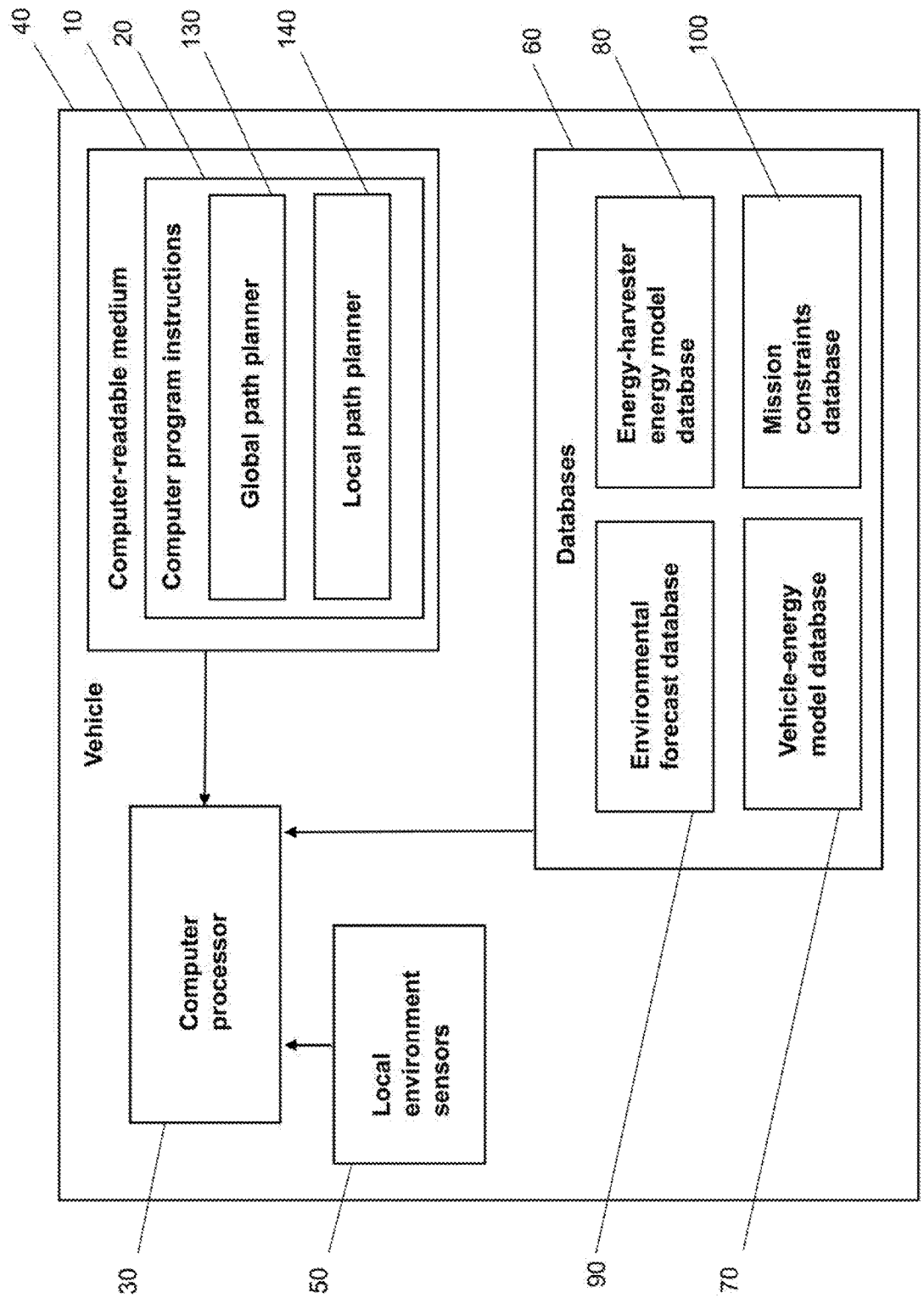
FIG. 1 is a block diagram of an embodiment of the instant invention.

An embodiment of the invention includes a standard computer-readable medium 10 storing computer program instructions 20 that, when executed by a standard computer processor 30 in a standard vehicle 40, cause the computer processor 30 to carry out a method for determining an energy-optimal path for the vehicle 40 from an initial location to a final location, for example, as shown in FIG. 1. The computer processor 30 communicates with standard local environment sensors 50 and with databases 60. The databases 60 are located on the vehicle, on a standard mobile platform 110, and/or a standard fixed platform 120. The vehicle 40 corresponds to a respective, standard vehicle-energy model.

For the purpose of this specification, "vehicle-energy model" is defined as an estimation of the rate of energy consumption and/or energy harvesting as a function of the time-varying environment, the vehicle state, vehicle dynamics, and/or an energy management strategy. For the purpose of this specification, "environment" is defined as including solar irradiance, wind, and air density, one or more of which vary with time. For the purpose of this specification, "vehicle state" is defined as vehicle parameters such as onboard fuel, battery state of charge, and altitude (which reflects how much potential energy the vehicle has at a present location). For the purpose of this specification, "vehicle dynamics" will be defined as vehicle parameters indicating what the vehicle is doing at the present location, i.e., the rate of change of the vehicle state at the present location. For the purpose of this specification, "energy management strategy" is defined as a set of rules governing vehicle behavior that are designed to achieve the desired rates of energy consumption, storage, and harvesting. For example, in an embodiment of the invention, the energy management strategy includes a control function that minimizes energy consumption and/or maximizes energy storage and energy harvesting.

For example, the vehicle-energy model is stored in one of the databases 60, e.g., a standard vehicle-energy model database 70. For example, an illustrative vehicle-energy model database includes models of vehicles likely to be used according to an embodiment of the instant invention. The vehicle-energy models represent time-varying power loads including the plurality of power load identifications and a plurality of power consumption profiles. Power consumption profiles correlate the power consumption of a vehicle to the environment surrounding the load and the activity of the vehicle. For example, the power consumption of a non-buoyant vehicle is often lower in a descending glide mode with no propulsion engaged and higher in a climb mode with a standard active propulsion system engaged. Illustrative active modes include acceleration, turning, and/or operating standard mission-appropriate devices on the vehicle, such as standard cameras. Each power load identification corresponds to a respective environment-dependent and activity-dependent power consumption profile. Examples of illustrative vehicle-energy models are found in W. Austyn Mair et al., *Aircraft Performance*, Cambridge University Press, December 2009, ISBN 9780511607134, https://doi.org/10.1017/CBO9780511607134, Cambridge, UK, and Francis J. Hale, *Introduction to Aircraft Performance, Selection and Design*, John Wiley & Sons, Inc., March 1984, ISBN-13: 978-0-471-07885-2, Hoboken, N.J., USA, both incorporated herein by reference.

Figure 4:
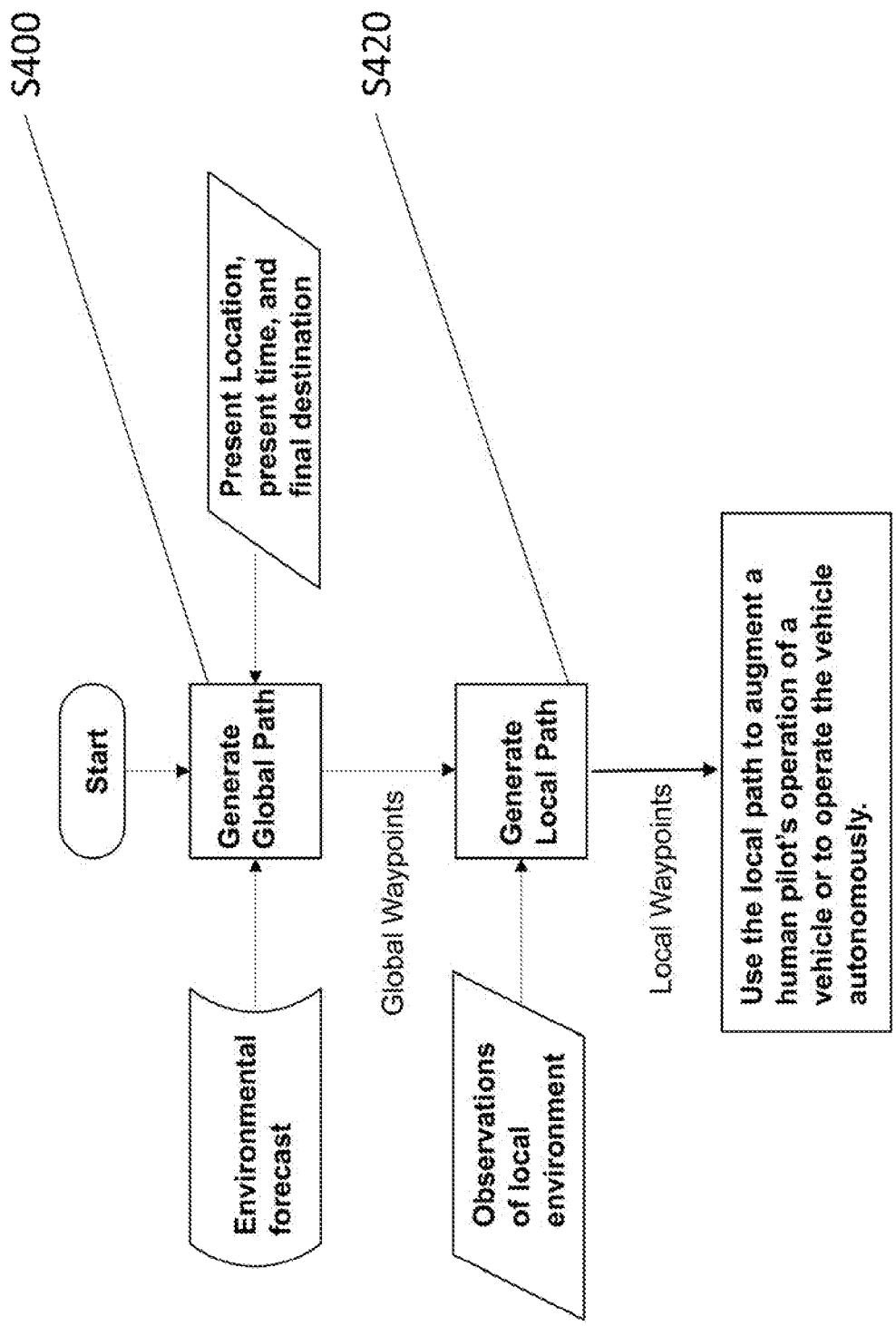
FIG. 4 is a flowchart of an embodiment of the instant invention.

A global path is generated based at least on the initial location, an initial time, the final location, the vehicle energy model, and an environmental forecast, the global path including a final maximum net energy path, as shown in Step S400 of FIG. 4. For example, the environmental forecast is stored in one of the databases 60, e.g., a standard environmental forecast database 90. For the purpose of this specification, "net energy" is defined as the sum of all energy harvesting, energy consumption, and/or energy storage over the path. For the purpose of this specification, "maximum net energy path" is defined as the path that results in the largest value of net energy when the vehicle arrives at the final location. Examples of maximum net energy path include minimum fuel consumption path, maximum energy harvesting path, and maximum battery state of charge path. For ease of understanding, FIG. 4 only shows one pass of a step of generating a global path. However, one of ordinary skill in the art will readily appreciate that this step would need to be repeated, if, for example, the weather forecast is significantly changed, local path planning (discussed below) or the vehicle itself (owing to an unforeseen disturbance) is diverted from an original global path so significantly that it becomes inefficient or infeasible to adhere to the original global path, or the final location is changed mid-course.

The global path includes a plurality of waypoints and, for example, associated optimal vehicle controls along with energy expenditure figures of merit that serve as reference goals for the local path planner discussed below. Examples of such energy expenditure figures of merit, include the amount (e.g., mass) of energy remaining in the form of fuel, altitude, battery state of charge, etc. and the rate of energy consumption. Based on the global path, a local path is generated from the present location to a next waypoint of the plurality of waypoints, as shown in Step S410 in FIG. 4. Generating a local path includes determining whether a net energy gain is generated by a deviation from the global path to the next waypoint of the plurality of waypoints. Generating a local path is repeated until the vehicle reaches the final location.

Figure 5:
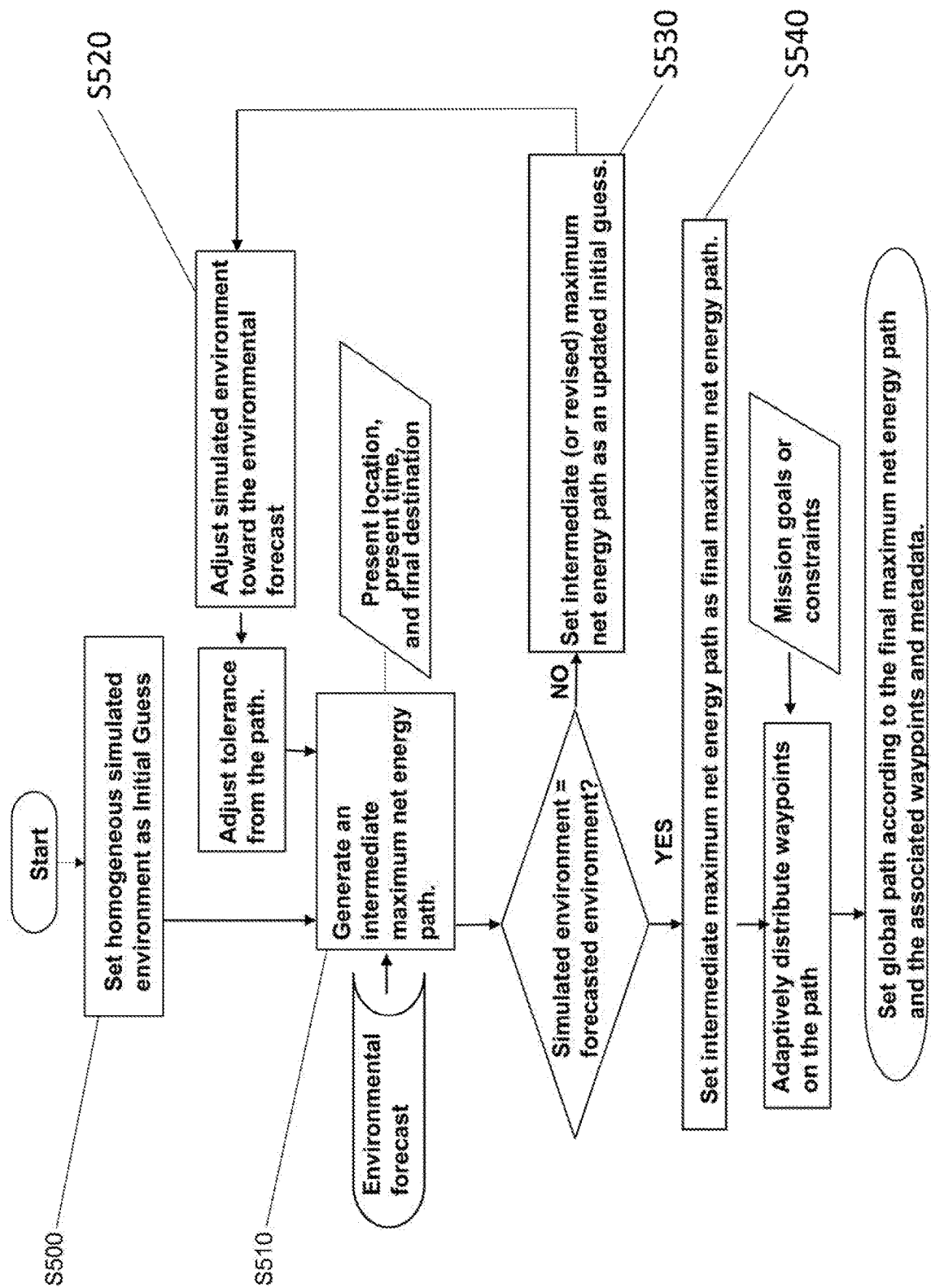
FIG. 5 is a flowchart of generating a global path according to another embodiment of the instant invention.

Optionally, a global path is generated as follows, with reference to FIG. 5. An initial guess of the global path in a simulated homogeneous environment is calculated, for example, based on the closed form analytical solution discussed below and as shown in Step S500. Based on the initial guess, an intermediate maximum net energy path is generated, as shown in Step S510. The simulated environment is adjusted toward the environmental forecast, if the simulated environment is not identical to the environmental forecast, as shown in Step S520. Based on the initial guess and the adjusted simulated environment, a revised maximum net energy path is generated. The revised maximum net energy path is set as the updated initial guess, as shown in Step S530. Adjusting the simulated environment toward the present environmental forecast, if the simulated environment is not identical to the environmental forecast, generating based on the initial guess of the previous pass or step and the adjusted simulated environment a revised maximum net energy path, and setting the revised maximum net energy path as the initial guess are repeated, until the simulated environment is identical to the present environmental forecast. The revised maximum net energy path is set as the final maximum net energy path, as shown in Step S540.

Optionally, the environmental forecast includes an atmospheric forecast, a water surface forecast, and/or an underwater forecast. Optionally, the atmospheric forecast is based in part on a historical atmospheric environment, the water surface forecast is based in part on a historical water surface environment, and the underwater environmental forecast is based in part on a historical underwater environment.

Optionally, the environmental forecast includes a plurality of data types. The data types have respective sizes. Storage space for storing the environmental forecast is reduced as follows. A next smaller environmental forecast data type of the plurality of data types is selected. The next-smaller environmental forecast data of the next smaller data type of the plurality of data types is removed. The next-smaller environmental forecast data is defined, for the purpose of this specification, as the environmental forecast data associated with the next smaller data type. After a global path is generated based at least on the initial location, the initial time, the final location, the vehicle energy model, and the environmental forecast, whether the final maximum net energy path is maintained is determined. Selecting a next smaller data type of the plurality of data types, removing data of the next smaller data type of the plurality of data types, and determining whether, after generating based at least on the initial location, an initial time, the final location, the vehicle energy model, and an environmental forecast a global path, the final maximum net energy path is maintained are repeated, until the final maximum net energy path is not maintained. A next larger data type of the plurality of data types is selected as an optimized data type for the environmental forecast. Next-larger environmental forecast data of the next larger data type of the plurality of data types is restored. The next-larger environmental forecast data is defined, for the purpose of this specification, as the environmental forecast data associated with the next larger data type.

Optionally, the vehicle includes a standard energy harvester. Examples of the energy harvester 80 include a standard solar panel, a standard thermal energy harvester, a standard wind energy harvester, and a standard kinetic energy harvester. Examples of thermal energy harvesters, according to an embodiment of the invention, include standard thermoelectric generators, such as Siemens division Mentor's exhaust heat thermoelectric generator that harnesses waste energy from a two-stroke engine for UAVs. Other examples of thermal energy harvesters, according to an embodiment of the invention, include standard updraft energy harvesters, such as discussed in Allen, M. J., Guidance and control for an autonomous soaring UAV, NASA TM-2007-214611 2007; Edwards, D. J., Implementation Details and Flight Test Results of an Autonomous Soaring Controller. AIAA Guidance, Navigation, and Control Conference, 2008; and Andersson, K. et al., On Stability of a Thermal Centering Controller. AIAA Guidance, Navigation, and Control Conference, 2009, all incorporated herein by reference. Examples of wind energy harvesters according to an embodiment of the invention include Seaformatics Systems Inc.'s Waterlily turbine and Nils Ferber's Micro Wind Turbine.

The energy harvester corresponds to a respective, standard energy-harvester energy model. The energy-harvester energy model is stored in one of the databases 60, e.g., a standard energy-harvester energy model database 80. Optionally, an energy harvester database of time-varying energy harvesters includes the plurality of energy harvester identifications and a plurality of power production profiles. Each energy harvester identification of the plurality of energy harvester identifications corresponds to a respective environment-dependent and activity-dependent power production profile of the plurality of power production profiles. Power production profiles correlate the power production of an energy harvester to the environment surrounding the energy harvester and the activity of the vehicle. For example, the rate of power production by a solar panel depends on its environment; it produces more power in an environment with more solar irradiance and less power in an environment with higher ambient temperature. Furthermore, power production by a solar panel power, for example, depends on the vehicle's activity and/or orientation toward the sun. Generating a global path further includes generating the global path based at least on the energy-harvester energy model.

Optionally, generating a global path includes distributing the plurality of waypoints along the global path according to a global waypoint distribution metric. The global waypoint distribution metric includes a time distribution metric, an energy distribution metric, a fuel distribution metric, a space distribution metric, and/or a curvature distribution metric.

Optionally, the plurality of waypoints distributed according to the time distribution metric includes a plurality of waypoints equidistant in time. For example, the time distribution metric ensures that traveling between each successive waypoint takes the same amount of time. Optionally, the plurality of waypoints distributed according to the energy distribution metric includes a plurality of waypoints equidistant in energy. For example, the energy distribution metric ensures that traveling between each successive waypoint takes the same amount of energy. Optionally, the plurality of waypoints distributed according to the fuel distribution metric includes a plurality of waypoints equidistant in time. For example, the fuel distribution metric ensures that traveling between each successive waypoint takes the same amount of fuel. Optionally, the plurality of waypoints distributed according to the space distribution metric includes a plurality of waypoints equidistant in space. For example, the space distribution metric ensures that the distance between successive waypoints is the same. Optionally, the plurality of waypoints distributed according to the curvature distribution metric includes a plurality of waypoints equidistant in curvature such that the global path includes at least one portion of greater curvature and/or at least one portion of lesser curvature and the plurality of equidistant-in-curvature waypoints includes more waypoints in the at least one portion of greater curvature and fewer waypoints in the at least one portion of less curvature. One of ordinary skill in the art will readily appreciate that waypoints equidistant in space are redundant for straight portions of the global path. However, less processing power and time need be devoted to distributing the equidistant waypoints as compared to distributing adaptively the waypoints along the global path in accordance with alternative global waypoint distribution metrics as discussed above.

Figure 2:
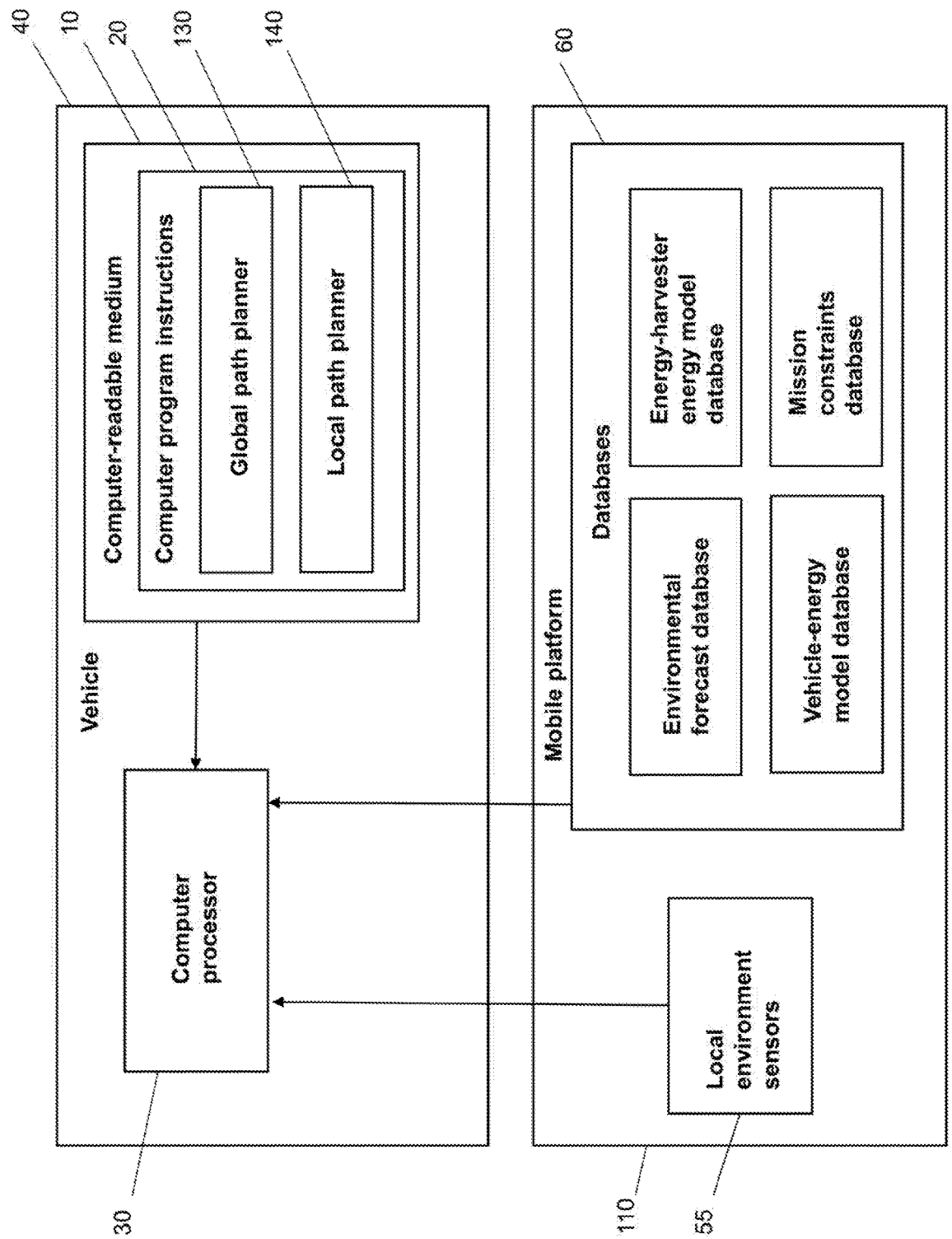
FIG. 2 is a block diagram of another embodiment of the instant invention.
Figure 3:
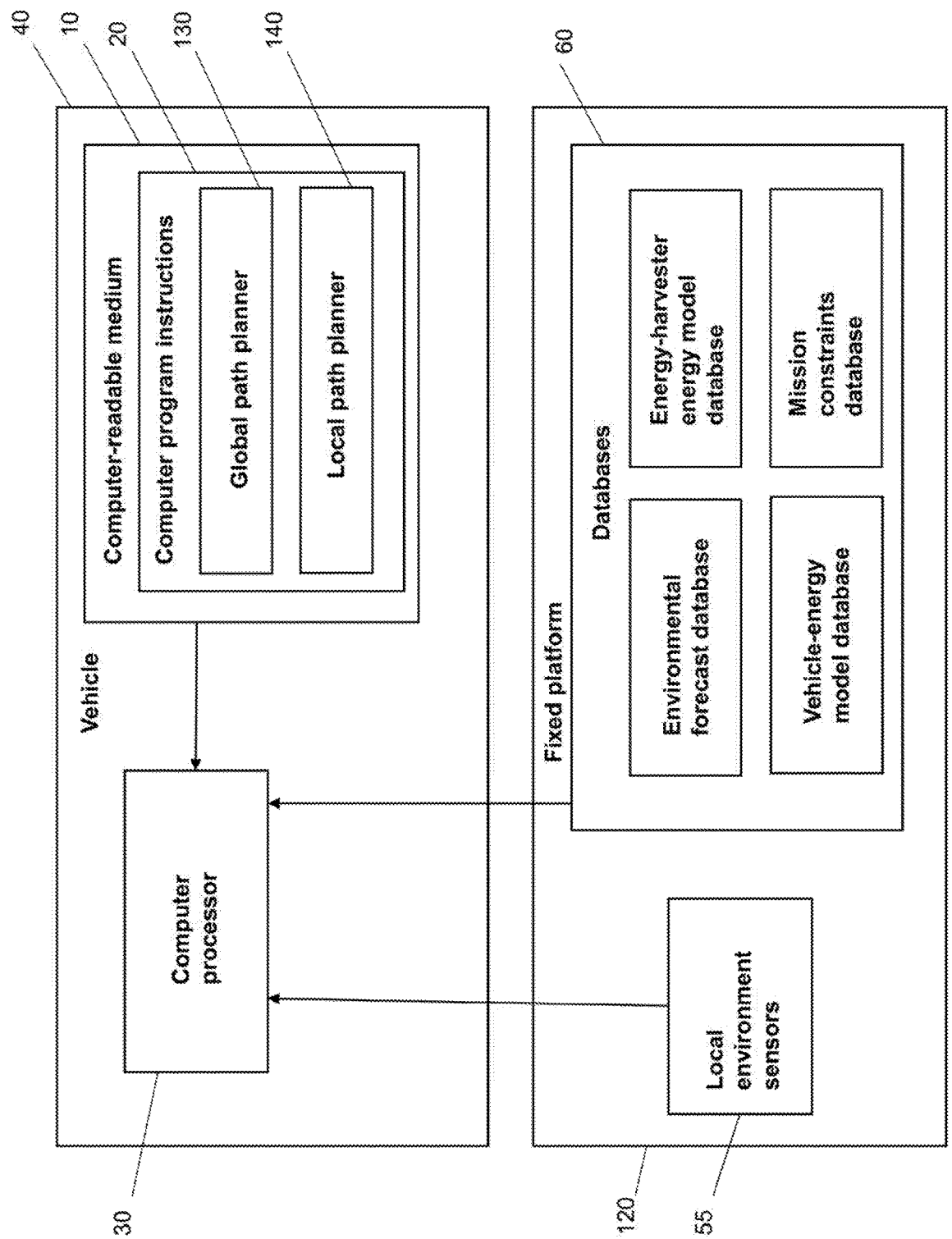
FIG. 3 is a block diagram of another embodiment of the instant invention.
Figure 6:
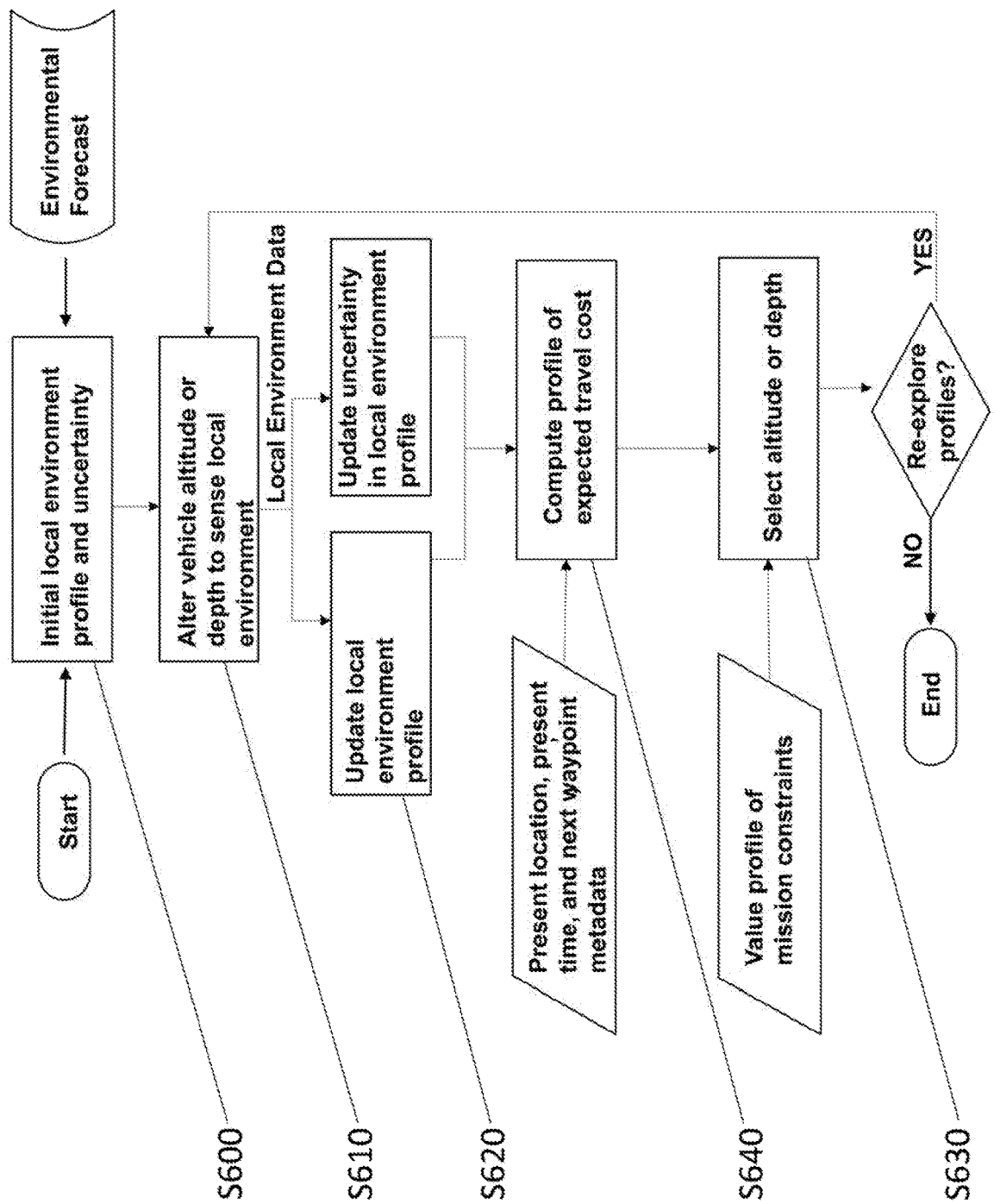
FIG. 6 is a flowchart of generating a local path according to embodiment of the instant invention.

Optionally, a local path is generated further as follows, with reference to FIG. 6. As shown in Step S600, a local environment is sensed at a present location of the vehicle 40 using one or more standard local environment sensors 50 onboard the vehicle, such as shown in FIG. 1, and/or using one or more standard local environment sensors 55 offboard the vehicle, such as shown in FIGS. 2 and 3 in direct or indirect communication with the computer processor 30. Optionally, the local environment includes at the present location and at a present time a local atmospheric environment, a local water surface environment, and/or a local underwater environment. For example, the local atmospheric environment includes wind velocity, solar irradiance, air density, relative humidity, and/or precipitation. For example, the local water surface environment includes the wind velocity, water current velocity, sea state, and/or the solar irradiance. For example, the local underwater environment includes the water current velocity, water density, and/or turbidity. For the purpose of this specification, the phrase "water density" reflects water salinity and/or water temperature. Accordingly, local environment sensors 50, 55 includes standard sensors for sensing the above-mentioned local atmospheric environment, local water surface environment, and/or local underwater environment characteristics. Optionally, generating a local path includes the following. A vehicle velocity is calculated using the sensed local environment to yield the net energy gain. Either the vehicle is operated autonomously at the calculated vehicle velocity until the vehicle arrives at the next waypoint of the plurality of waypoints or the calculated vehicle velocity is set as a default vehicle velocity to augment a human operator of the vehicle 40. For example, the vehicle 40 is operated autonomously via a standard autopilot, such as ArduPilot Open Source AutoPilot and MicroPilot's series of autopilots.

Offboard sensors 55 are located, for example, on a standard mobile platform and/or on a standard fixed platform. Examples of the mobile platform 110 include standard airplanes, standard aerial drones, standard ships, standard water surface drones, standard submarines, standard underwater drones, standard meteorological hot air balloons, standard sonobuoys, standard towed sensor arrays, and standard meteorological satellites. For example, the vehicle 40 and the mobile platform 110 share local environmental data by standard peer production to reduce the local environment sensors' size-weight-and-power burden on any one vehicle. Examples of the fixed platform 120 include standard ground stations.

Optionally, the plurality of waypoints respectively corresponds to a plurality of waypoint metadata. Each waypoint metadata of the plurality of waypoint metadata includes vehicle velocity metadata, location metadata, remaining-energy metadata, and/or arrival-time metadata. A local path is generated further as follows. Whether the net energy gain is generated by the deviation from the present location along the global path to the next waypoint of the plurality of waypoints such that the vehicle arrives at the next waypoint of the plurality of waypoints constrained by at least one next waypoint metadatum of the plurality of waypoint metadata is determined. For the purpose of this specification, the phrase "constrained by" indicates that the vehicle must get to the next waypoint with at least as much remaining energy as indicated by the next waypoint's remaining-energy data and/or ahead or on-time relative to the next waypoint's arrival-time data. Sensing the local environment includes adjusting a vehicle altitude or a vehicle depth. Determining whether the net energy gain is generated by the deviation from the present location along the global path to the next waypoint of the plurality of waypoints such that the vehicle arrives at the next waypoint of the plurality of waypoints constrained by at least one next waypoint metadatum of the plurality of waypoint metadata includes the following. One or more local environment profiles as a function of the adjusted vehicle altitude or the adjusted vehicle depth are generated. An optimal altitude or an optimal depth for the vehicle to arrive at the next waypoint of the plurality of waypoints with the net energy gain. The vehicle is operated autonomously at the calculated optimal altitude or the calculated optimal depth. Alternatively, the calculated optimal altitude or the calculated optimal depth is set as a default altitude or default depth respectively to the next waypoint of the plurality of waypoints. Generating at least one local environment profile, calculating an optimal altitude or an optimal depth for the vehicle until the next waypoint, and operating the vehicle autonomously at the calculated optimal altitude or the calculated optimal depth or setting the calculated optimal altitude or the calculated optimal depth as a default altitude or default depth respectively to the next waypoint of the plurality of waypoints are repeated, until the vehicle arrives at the next waypoint of the plurality of waypoints.

Optionally, a local path is further generated as follows. At least one local path goal is received. Local path goals are mission goals, which are not completely captured in the global path but which shape (if the mission is negotiable) or constrain (if the mission is not negotiable) the behavior of the local planner 140. When the mission is negotiable, or when the operator can quantify mission utility as a function of altitude, then the local planner 140, for example, maximizes a combination of energy efficiency and mission utility. If the mission is a hard requirement, then the local planner 140, for example, minimizes energy consumption while respecting the mission constraint. An illustrative local path includes remaining below a specified altitude to improve the resolution of an imaging system. Another illustrative local path includes remaining above a specified altitude to improve the line of sight of a radar or communications system. An energy cost of the at least one local path goal is assessed. The assessed energy cost is compared with at least one available standard energy resource. For example, the energy resource includes a standard energy storage device. Optionally, the energy storage device corresponds to a respective energy storage model stored in one of the databases 60, e.g., a standard energy storage device database. A feasibility of the at least one local path goal is assessed based at least in part on comparing the assessed energy cost with at least one available energy resource. The vehicle is operated autonomously based on the assessed feasibility; alternatively, a default vehicle operation is set to the next waypoint of the plurality of waypoints based on the assessed feasibility.

For example, the energy storage device database includes energy storage device identifications for one or more energy storage devices. Such energy storage device identifications are associated in the energy storage device database with respective energy storage device characteristics, such as open circuit voltage, equivalent series resistance, charge capacity, minimum voltage, maximum voltage, weight, and/or volume. Open circuit voltage, equivalent series resistance, charge capacity, minimum voltage and maximum voltage may vary with temperature. Open circuit voltage and equivalent series resistance may also vary with state of charge. In an embodiment of the invention, energy storage device characteristics are indexed to different temperatures such that different values for open circuit voltage, equivalent series resistance, charge capacity, minimum voltage and/or maximum voltage for the same energy storage device are optionally stored in the vehicle energy model database 70. In an embodiment of the invention, energy storage device characteristics are also indexed to different states of charge such that different values for open circuit voltage and equivalent series resistance, for the same energy storage device are optionally stored in the vehicle energy model database 70.

Optionally, the vehicle 40 includes a standard aerial vehicle, a standard surface vehicle and/or a standard underwater vehicle. For example, the aerial vehicle includes a standard unmanned aerial vehicle. For example, the surface vehicle includes a standard unmanned surface vehicle. For example, the underwater vehicle includes a standard unmanned underwater vehicle.

Another embodiment of the invention includes a computer program 20 for a novel path planner for a standard unmanned air vehicle ("UAV") and is described as follows. The UAV is an example of the vehicle 40. For the purpose of this specification, air vehicles and aerial vehicles are understood to be interchangeable terms of art. The computer-programmed path planner 20 includes the following steps.

First, the human operator of the UAV sets the initial (i.e., take-off) and final (i.e., destination) locations for the UAV in the computer-programmed path planner 20. Optionally, the assignment of initial and final locations is done automatically based on the known current location of the aircraft (for the initial location) measured by the onboard autopilot and the desired destination (for the final location) out of the set that includes the ultimate goal destination and the known closest possible landing sites.

Second, standard weather forecast data, including the forecasted wind and solar irradiance in the operating region, is obtained from standard numerical weather simulations. The weather forecast data is represented in a standard format with care taken to significantly reduce (e.g., 5-10 times less than normally used) its size in bytes without any loss of significant information (e.g., 3D wind and solar irradiance).

Third, the computer-programmed path planner 20 includes a global path planner 130. The global path planner 130 uses vehicle-energy models and vehicle-harvester energy models for the UAV's vehicle dynamics and energy systems, respectively, and the forecasted weather, to estimate the rate of energy expenditure and energy harvesting along a route between the initial and final locations. A standard great circle route is, for example, pre-selected as a baseline, or well-defined initial guess.

Fourth, the global path planner 130 searches the trajectory between the initial and final locations to identify minimum energy or minimum fuel consumption path, called the global path. The global path planner 130 adaptively distributes global waypoints along the path to best capture the features of the path. A standard adaptive resampling algorithm distributes evenly the waypoints along the continuous solution of the global path according to desired global waypoint distribution metric. The global waypoint distribution metric is any operationally meaningful parameter that is essential for the mission at hand. For example, using time as the global waypoint distribution metric results in an equidistant-in-time distribution of global waypoints. As another example, using energy as the global waypoint distribution metric results in an equidistant-in-energy distribution of global waypoints. Similarly, using fuel as the global waypoint distribution metric results in an equidistant-in-fuel distribution of global waypoints. As yet another example, using curvature as the global waypoint distribution metric results in an equidistant-in-curvature or turn-rate distribution of global waypoints. These global waypoints describe the global path, for example, in a way acceptable to standard autopilots. Each waypoint position in inertial space (latitude, longitude, and/or altitude) is assigned metadata from the global path planner such as universal time, vehicle airspeed, altitude, and energy state (e.g., fuel remaining).

Fifth, the computer-programmed path planner 20 also includes a local path planner 140. The local path planner 140 "drives" the UAV to reach the next global waypoint constrained by a standard operator-determined mission constraints or goals, as expected by the global path and as indicated in the metadata for the next global waypoint. Examples of such operator-determined mission constraints or goals include maximum energy at the time of arrival at the final destination and shortest trip time. Because the weather forecast data has insufficient spatial and/or temporal resolution to capture local environmental features, the local path planner 140 uses local environment measurements to identify and exploit potentially advantageous local environment conditions, such as regions of rising air, favorable wind, and favorable solar irradiance. The local path planner 140 also uses local environment measurements to identify and to minimize the negative impact of potentially disadvantageous local environment conditions, such as sinking air, unfavorable wind, and unfavorable solar irradiance.

Sixth, optionally, new global paths are computed as the weather forecasts are updated, and the local path planner 140 continues to track the next global waypoint, wherever it falls in the new global path. Optionally, the local path planner 140 can request a new global plan from the global path planner 130, if the local path planner 140 finds that the global waypoint metadata does not agree with the observed environment.

In this embodiment of the invention, the global path can be thought of as a top-level approximation of the best way to get from an initial location to a final location, and the local path can be thought of as a reaction to local observations as the vehicle traverses the global path. That is, decomposition of the energy management process into a global problem and a local problem enables the use of large-scale environmental data to solve the global path planning problem and local observations to solve the local path planning problem.

In another embodiment of the invention, other standard energy harvesting or standard propulsion technologies employ alternative sources of environmental data and different environmental parameters. For example, air density is a useful environmental parameter, when planning a minimum energy consumption path for a lighter than air vehicle. As another example, terrain type (rather than simple elevation) is a useful environmental parameter, when plotting minimum energy consumption paths for ground vehicles.

In another embodiment of the invention, standard heuristics are applied to the global and local path planners 130, 140 to obtain improved planner performance (e.g., accuracy and speed) and/or to tailor vehicle behavior. For example, the initial guess of the global path planner utilizes historical observations of the best seasonal routes between the initial and final locations or between any points in the vicinity of the initial and final locations. In general, the global path planner 130 creates a database of optimal solutions that span seasonal variations of weather or other user-determined parameter, such as altitude or depth. In turn, the local path planner 140 is constrained in how far it can deviate from the global path in search of energy harvesting opportunities, to reduce the likelihood that it will unexpectedly fail to reach the next global waypoint.

In another embodiment of the invention, non-energy path planning goals are merged with the energy planning process by modifying the energy environment without incurring any significant computational cost. For example, if a local region is excluded by assigning it an artificially high energy cost, then the global path planner 130 and/or the local path planner 140 generates path solutions that avoid the region. As another example, if a local region is assigned an artificially high energy gain, then the global path planner 130 and/or the local path planner 140 generates path solutions that visit those regions.

In another embodiment of the invention, vehicle dynamics and energy models employed by the local path planner 140 are used to inform vehicle operation. For example, such informed vehicle operation includes turning off a vehicle engine, when it is operating at too low a power output to be efficient. While not strictly a path-planning activity, the understanding of the energy environment and vehicle state captured by the local path planner is optionally used to vary the vehicle operating scheme, for example, to minimize energy consumption as it transits the local path.

Another embodiment of the invention is described as follows. This embodiment of the invention includes (i) a new optimal control law and (ii) a fast computational algorithm that solve the problem of minimum energy (e.g., fuel) routing of the vehicle 40 capable of harvesting energy (e.g., wind energy and/or solar energy), while being constrained by the amount of energy (e.g., fuel) available onboard. A typical application of this task arises in long endurance operation of the vehicle 40 (e.g., a standard aircraft, a standard surface vessel, a standard sailboat, or a standard underwater vehicle) that generally operates in a time-varying environment and need to find the best (e.g., optimal) route between the initial and final destinations. The time-varying environment is an environment that exhibits distributed environmental energy, which changes over time and space. Examples of such a time-varying environment includes ones with wind currents or ocean currents. The figure of merit in optimal routing is the absolute minimum of a constrained resource, such as fuel or energy stored in a standard onboard battery for the vehicle 40. The general problem of optimal routing consists in finding the optimal solution (i.e., a control law or a resulting trajectory) of a highly nonlinear and time-varying dynamic system (in this case, the vehicle 40) such that it satisfies the optimality condition given, for example, by a standard Hamiltonian of the system along the chosen trajectory. According to this embodiment of the invention, the general problem is solved in two steps. In the first step, a true optimal control law of a minimum energy (e.g., fuel) routing problem is obtained in analytical form by solving the Hamiltonian with respect to the heading (or a bank angle) control command of the vehicle 40 (e.g., an aerial vehicle). This allows formulating the optimal control task as a classical boundary value problem ("BVP"). In the second step, an ideal (i.e., a true optimal) initial guess is derived and utilized in a standard continuation numerical algorithm. Together with the analytical form of the control law, the continuation approach results in a sub-minute computational time of an exemplary problem of finding the optimal route for the vehicle 40 (e.g., a solar-powered autonomous aircraft) traversing, for example, long distances between an initial location and a final location.

According to this embodiment of the invention, the continuation numerical algorithm, for example, explicitly formulates the control task as the optimal energy utilization problem that maximizes energy intake from the environment and minimizes energy waste. Energy intake considers, for example, utilization of photovoltaic technology that harvests solar irradiation during the day-time operation; solar energy intake is an explicit function of time and position of the vehicle 40 on the Earth's surface with respect to the Sun. Energy waste is minimized by optimally steering the vehicle 40 in the wind flow (or ocean currents) that maximizes the use of tailwind (or downstream ocean currents). The difference of energy required for robust operation (e.g., wings level flight at constant airspeed) and the energy supplied by the environment (e.g., wind plus solar) is compensated by the limited amount of energy (e.g., fuel) stored onboard; if the energy difference is negative (i.e., representing an excess of energy), then, for example, the onboard batteries are optionally recharged. The essence of the optimal routing task is to find the best control law and the corresponding trajectory that minimizes the burn rate of the energy available onboard while providing guarantees of successful transition from the initial to final destination.

The optimal control law is the analytical solution of the Hamiltonian of the minimum energy (e.g., fuel) task with respect to the heading control function. The closed-form analytical formula allows formulating the task in the form of a boundary value problem ("BVP" that enables using a plethora of standard numerical methods for its fast numerical solution. Thus, the analytical form of the optimal control law enables formulation of the optimal control task in the form of a classical BVP problem in the first step of this embodiment of the invention.

The second step in the overall approach of this embodiment of the invention involves meeting the fundamental challenge of optimal control theory by finding a good initial guess that includes states and costates of the underlying BVP task. Meeting the initial guess challenge involves recognizing that a straight line (i.e., an arc of a great circle on the Earth's surface) is the optimal solution of the minimum energy task in no-wind conditions. Therefore, the numerical solution of the BVP problem entails a continuation algorithm for a system of ordinary differential equations ("ODEs") that start at zero wind as the ideal initial guess (i.e., the straight line or great circle route) and gradually amplifies the (air or water) currents scale, until it reaches the desired magnitude of the wind. The uniform convergence of the BVP solver applied to the underlying set of ODEs is facilitated by a standard scaling technique that normalizes the states and costates of the BVP system to guarantee that they maintain comparable magnitudes. Otherwise, if the derivatives of states and costates were significantly different, then the integration mechanism would adapt only to the fastest changing dynamics (by taking small steps in an effort to preserve precision), resulting in significantly longer time to converge to a solution and, by extension, in a significantly longer computation time for the entire algorithm. The analytically defined control law with zero wind magnitude (i.e., wind scale being equal to zero thus cancelling the wind) always produces a straight line solution that captures all the dynamics of states and costates. This solution serves as an excellent initial guess for the next step of the continuation algorithm. Moreover, the first step requires little or negligible computational time (e.g., less than a second) and produces an intermediate solution of the optimal control problem with optimality guarantees. Although continuing the wind scaling procedure results in a larger number of tasks, each optimal control task is solved quickly because the initial guess at each iteration very closely approximating the optimal solution for that iteration. Therefore, while solving a larger number of tasks, the total computational time is orders of magnitude less than the time required to solve the original task once with full-scale wind.

Execution of an embodiment of the invention entails less than a minute of computational time on a standard general purpose computer, such as a standard MacBook Pro with an Intel Core i7 CPU. Another embodiment of the invention is implemented onboard a standard circuit board having a standard microprocessor found in standard smartphones, such as a standard credit card size ARM-based microprocessor board. Such other embodiments of the invention evidence comparable computational efficiency to embodiments of the invention employing general purpose computers.

Advantageously, an embodiment of the invention provides optimality guarantees of its fast numerical implementation that is achieved by explicitly solving the underlying Hamiltonian of the optimal control task and using scaling-continuation numerical approach in implementation.

An embodiment of the invention includes computer program instructions, which computer program instructions embody the steps, functions, filters, and/or subsystems described herein relative to iterative process for generating the highest-rated device response. However, it should be apparent that there could be many different ways of implementing the invention in computer programming, and the invention should not be construed as limited to any one set of computer program instructions. Further, a skilled programmer would be able to write such a computer program to implement an exemplary embodiment based on the appended diagrams and associated description in the application text. Therefore, disclosure of a particular set of program code instructions is not considered necessary for an adequate understanding of how to make and use the invention. The inventive functionality of the claimed computer program will be explained in more detail in the following description read in conjunction with the program flow in the embodiments of the invention described above.

One of ordinary skill in the art will recognize that the methods, systems, and control laws discussed above may be implemented in software as software modules or instructions, in hardware (e.g., a standard application-specific integrated circuit ("ASIC")), or in a combination of software and hardware. The methods, systems, and control laws described herein may be implemented on many different types of processing devices by program code comprising program instructions that are executable by one or more processors. The software program instructions may include source code, object code, machine code, or any other stored data that is operable to cause a processing system to perform methods described herein.

The methods, systems, and control laws may be provided on many different types of standard computer-readable media including standard computer storage mechanisms (e.g., CD-ROM, diskette, RAM, flash memory, computer's hard drive, etc.) that contain instructions for use in execution by a standard processor to perform the methods' operations and implement the systems described herein.

The computer components, software modules, functions and/or data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

Systems and methods disclosed herein may use data signals conveyed using networks (e.g., local area network, wide area network, internet, etc.), fiber optic medium, carrier waves, wireless networks, etc. for communication with one or more data-processing devices. The data signals can carry any or all of the data disclosed herein that is provided to or from a device.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
   one of a mobile platform and a fixed platform; and
   a non-transitory computer-readable medium storing instructions that, when executed by a computer on the one of a mobile platform and a fixed platform, cause the computer to carry out a method for determining an energy-optimal path for a vehicle from an initial location to a final location, the vehicle corresponding to a vehicle energy model, the method comprising:
      generating based at least on the initial location, an initial time, the final location, the vehicle energy model, and an environmental forecast a global path, the global path comprising a final maximum net energy path, the global path comprising a plurality of waypoints;
      generating based on the global path a local path from the present location to a next waypoint of the plurality of waypoints, said generating a local path comprising determining whether a net energy gain is generated by a deviation from the global path to the next waypoint of the plurality of waypoints; and
      repeating said generating a local path until the vehicle reaches the final location.

2. The apparatus according to claim 1, wherein said generating a global path comprises:
   providing an initial guess of the global path in a simulated environment;
   generating based on the initial guess an intermediate maximum net energy path;
   adjusting the simulated environment toward the environmental forecast, if the simulated environment is not identical to the environmental forecast;
   generating based on the initial guess and the adjusted simulated environment a revised maximum net energy path;
   setting the revised maximum net energy path as the initial guess;
   repeating said adjusting the simulated environment toward the environmental forecast, if the simulated environment is not identical to the environmental forecast, said generating based on the initial guess and the adjusted simulated environment a revised maximum net energy path, and said setting the revised maximum net energy path as the initial guess until the simulated environment is identical to the environmental forecast; and
   setting the revised maximum net energy path as the final maximum net energy path.

3. The apparatus according to claim 1, wherein the environmental forecast comprises at least one of an atmospheric forecast, a water surface forecast, and an underwater forecast.

4. The apparatus according to claim 3, wherein the atmospheric forecast is based in part on a historical atmospheric environment,
   wherein the water surface forecast is based in part on a historical water surface environment, and
   wherein the underwater environmental forecast is based in part on a historical underwater environment.

5. The apparatus according to claim 1, wherein the environmental forecast comprises a plurality of data types and, the method further comprising:
- reducing storage space for storing the environmental forecast by:
- selecting a next smaller data type of the plurality of data types;
- removing data of the next smaller data type of the plurality of data types;
- determining whether, after said generating based at least on the initial location, an initial time, the final location, the vehicle energy model, and an environmental forecast a global path, the final maximum net energy path is maintained;
- repeating said selecting a next smaller data type of the plurality of data types, said removing data of the next smaller data type of the plurality of data types, and said determining whether, after said generating based at least on the initial location, an initial time, the final location, the vehicle energy model, and an environmental forecast a global path, the final maximum net energy path is maintained until the final maximum net energy path is not maintained;
- selecting a next larger data type of the plurality of data types as an optimized data type for the environmental forecast; and
- restoring data of the next larger data type of the plurality of data types.

6. The apparatus according to claim 1, wherein the vehicle comprises an energy harvester, the energy harvester corresponds to a respective energy-harvester energy model,
- wherein said generating a global path further comprises generating the global path based at least on the energy-harvester energy model.

7. The apparatus according to claim 1, wherein said generating a global path comprises:
- distributing the plurality of waypoints along the global path according to a global waypoint distribution metric, the global waypoint distribution metric comprising one of a time distribution metric, an energy distribution metric, a fuel distribution metric, a space distribution metric, and a curvature distribution metric.

8. The apparatus according to claim 7, wherein the plurality of waypoints distributed according to the time distribution metric comprises a plurality of equidistant-in-time waypoints,
- wherein the plurality of waypoints distributed according to the energy distribution metric comprises a plurality of equidistant-in-time waypoints,
- wherein the plurality of waypoints distributed according to the fuel distribution metric comprises a plurality of equidistant-in-time waypoints,
- wherein the plurality of waypoints distributed according to the space distribution metric comprises a plurality of equidistant-in-space waypoints,
- wherein the plurality of waypoints distributed according to the curvature distribution metric comprises a plurality of equidistant-in-curvature waypoints such that the global path comprises at least one of at least one portion of greater curvature and at least one portion of lesser curvature and the plurality of equidistant-in-curvature waypoints comprises more waypoints in the at least one portion of greater curvature and fewer waypoints in the at least one portion of less curvature.

9. The apparatus according to claim 1, wherein said generating a local path comprises:
- sensing a time-varying local environment at a present location of the vehicle using at least one of at least one onboard sensor on the vehicle and at least one offboard sensor in one of direct and indirect communication with the computer.

10. The apparatus according to claim 9, wherein the local environment comprises at the present location and at a present time at least one of a local atmospheric environment, a local water surface environment, and a local underwater environment,
- wherein the local atmospheric environment comprises at least one of wind velocity, solar irradiance, air density, relative humidity, and precipitation,
- wherein the local water surface environment comprises at least one of the wind velocity, water current velocity, sea state, and the solar irradiance,
- wherein the local underwater environment comprises at least one of the water current velocity, water density, and turbidity.

11. The apparatus according to claim 9, wherein said generating a local path comprises:
- calculating using the sensed time-varying local environment a vehicle velocity to yield the net energy gain; and
- one of operating the vehicle autonomously at the calculated vehicle velocity until the vehicle arrives at the next waypoint of the plurality of waypoints and setting the calculated vehicle velocity as a default vehicle velocity.

12. The apparatus according to claim 9, wherein the plurality of waypoints respectively corresponds to a plurality of waypoint metadata, each waypoint metadata of the plurality of waypoint metadata comprising at least one of vehicle velocity metadata, location metadata, remaining-energy metadata, and arrival-time metadata,
- wherein said generating a local path comprises:
  - determining whether the net energy gain is generated by the deviation from the present location along the global path to the next waypoint of the plurality of waypoints such that the vehicle arrives at the next waypoint of the plurality of waypoints constrained by at least one next waypoint metadatum of the plurality of waypoint metadata.

13. The apparatus according to claim 12, wherein said sensing the local environment comprises one of adjusting a vehicle altitude and a vehicle depth,
- wherein said determining whether the net energy gain is generated by the deviation from the present location along the global path to the next waypoint of the plurality of waypoints such that the vehicle arrives at the next waypoint of the plurality of waypoints constrained by at least one next waypoint metadatum of the plurality of waypoint metadata comprises:
- generating at least one local environment profile as a function of one of the adjusted vehicle altitude and the adjusted vehicle depth;
- calculating one of an optimal altitude and an optimal depth for the vehicle to arrive at the next waypoint of the plurality of waypoints with the net energy gain;
- one of operating the vehicle autonomously at the calculated one of the optimal altitude and the optimal depth and setting the calculated one of the optimal altitude and the optimal depth as one of a default altitude and default depth respectively to the next waypoint of the plurality of waypoints;
- repeating said generating at least one local environment profile, said calculating one of an optimal altitude and an optimal depth for the vehicle until the next waypoint, and said one of operating the vehicle autonomously at the calculated one of the optimal altitude and the optimal depth and setting the calculated one of the optimal altitude and the optimal depth as one of a default altitude and default depth respectively to the next waypoint of the plurality of waypoints until the vehicle arrives at the next waypoint of the plurality of waypoints.

14. The apparatus according to claim 1, wherein said generating a local path comprises:
receiving at least one local path goal;
assessing an energy cost of the at least one local path goal;
comparing the assessed energy cost with at least one available energy resource;
assessing a feasibility of the at least one local path goal based at least in part on said comparing the assessed energy cost with at least one available energy resource;
one of operating the vehicle autonomously based on the assessed feasibility and setting a default vehicle operation to the next waypoint of the plurality of waypoints based on the assessed feasibility.

15. The apparatus according to claim 1, wherein the vehicle comprises at least one of an aerial vehicle, a surface vehicle and an underwater vehicle.

16. The apparatus according to claim 1, wherein the aerial vehicle comprises an unmanned aerial vehicle,
wherein the surface vehicle comprises an unmanned surface vehicle, and wherein the underwater vehicle comprises an unmanned underwater vehicle.

* * * * *